(12) United States Patent
Havskjold et al.

(10) Patent No.: US 10,486,600 B1
(45) Date of Patent: Nov. 26, 2019

(54) SYSTEMS FOR IMPROVING SIDE-MIRROR FUNCTIONALITY OF A VEHICLE

(71) Applicants: David G. Havskjold, Portola Valley, CA (US); Arthur Y. Zhang, Cupertino, CA (US); Hyungryul Choi, Cupertino, CA (US); Matthew E. Last, San Jose, CA (US); Clarisse Mazuir, San Jose, CA (US)

(72) Inventors: David G. Havskjold, Portola Valley, CA (US); Arthur Y. Zhang, Cupertino, CA (US); Hyungryul Choi, Cupertino, CA (US); Matthew E. Last, San Jose, CA (US); Clarisse Mazuir, San Jose, CA (US)

(73) Assignee: Apple Inc., Cupertino, CA (US)

( * ) Notice: Subject to any disclaimer, the term of this patent is extended or adjusted under 35 U.S.C. 154(b) by 275 days.

(21) Appl. No.: 15/271,729

(22) Filed: Sep. 21, 2016

Related U.S. Application Data

(60) Provisional application No. 62/233,751, filed on Sep. 28, 2015.

(51) Int. Cl.
*B60R 1/12* (2006.01)
*B60R 1/074* (2006.01)
(Continued)

(52) U.S. Cl.
CPC ............... *B60R 1/12* (2013.01); *B60R 1/006* (2013.01); *B60R 1/025* (2013.01); *B60R 1/074* (2013.01);
(Continued)

(58) Field of Classification Search
CPC ................................................................
B60R 1/12; B60R 1/006; B60R 1/025; B60R 1/074; B60R 2001/1223;
(Continued)

(56) References Cited

U.S. PATENT DOCUMENTS 4,911,545 A * 3/1990 Miller ..................... B60R 1/078
359/841
6,204,753 B1   3/2001 Schenk et al.
(Continued)

FOREIGN PATENT DOCUMENTS

EP    2012286 A2 * 1/2009 ............ B60W 40/09

*Primary Examiner* — Maria E Vazquez Colon
(74) *Attorney, Agent, or Firm* — Young Basile Hanlon & MacFarlane, P.C.

(57) ABSTRACT

Systems are presented for improving side mirror functionality of a vehicle. In one embodiment, the systems involve a side mirror with an adjustable profile. The systems include an actuator for altering the adjustable profile of a mirror in response to signals from a sensor (e.g., a camera). The mirror is coupled to a side of the vehicle through the actuator. In another embodiment, the systems involve an integrated side mirror. The systems include a first transmissive optic, a second transmissive optic, and at least one optical element that enable a field of view to be seen through a portion of the vehicle. In an additional embodiment, the systems involve a display system for integrating side-mirror functionality into a display image. The display system includes an image processing unit and a display unit for forming a display image at a location visible to a driver. The display image includes a field of view imaged by a sensor. Other systems are presented.

20 Claims, 3 Drawing Sheets

(51) Int. Cl.
*B60R 1/02* (2006.01)
*B60R 1/00* (2006.01)
*G02B 6/34* (2006.01)
*G06K 9/00* (2006.01)

(52) U.S. Cl.
CPC .......... *G02B 6/34* (2013.01); *G06K 9/00604* (2013.01); *G06K 9/00791* (2013.01); *G06K 9/00832* (2013.01); *B60R 2001/1223* (2013.01); *B60R 2001/1253* (2013.01); *B60R 2300/103* (2013.01); *B60R 2300/20* (2013.01); *B60R 2300/30* (2013.01); *B60R 2300/303* (2013.01); *B60R 2300/8026* (2013.01)

(58) Field of Classification Search
CPC ...... B60R 2001/1253; B60R 2300/103; B60R 2300/20; B60R 2300/30; B60R 2300/303; B60R 2300/8026; G02B 6/34; G06K 9/00604; G06K 9/00791; G06K 9/00832
See application file for complete search history.

(56) References Cited

U.S. PATENT DOCUMENTS

| | | | |
|---|---|---|---|
| 6,717,518 B1* | 4/2004 | Pirim | ................. B60R 1/04 340/576 |
| 6,979,739 B2 | 12/2005 | Grushin et al. | |
| 7,415,126 B2 | 8/2008 | Breed et al. | |
| 7,792,329 B2 | 9/2010 | Schofield et al. | |
| 8,285,457 B1* | 10/2012 | Askew | .................. B60R 1/0612 359/841 |
| 10,007,112 B2* | 6/2018 | Fitch | ......................... B60R 1/04 |
| 2003/0214584 A1 | 11/2003 | Ross, Jr. | |
| 2006/0244829 A1 | 11/2006 | Kato et al. | |
| 2007/0296840 A1* | 12/2007 | Takada | .............. H01L 27/14621 348/272 |
| 2008/0100939 A1* | 5/2008 | Brester | ................. B60R 1/0605 359/872 |
| 2008/0158096 A1 | 7/2008 | Breed | |
| 2009/0143967 A1* | 6/2009 | Lee | ........................... B60R 1/00 701/119 |
| 2010/0066833 A1 | 3/2010 | Ohshima et al. | |
| 2010/0194596 A1* | 8/2010 | Wang | ....................... B60R 1/00 340/936 |
| 2013/0051040 A1* | 2/2013 | Kracker | ............... B60Q 1/2665 362/464 |
| 2014/0078306 A1* | 3/2014 | Miyoshi | .................... B60R 1/00 348/148 |
| 2014/0222298 A1* | 8/2014 | Gurin | ................. B60W 50/085 701/49 |
| 2014/0333729 A1* | 11/2014 | Pflug | ....................... G06T 15/20 348/47 |
| 2015/0232030 A1* | 8/2015 | Bongwald | ................. B60R 1/00 348/115 |
| 2018/0031834 A1* | 2/2018 | Yamamura | ......... G02B 27/0149 |
| 2018/0181067 A1* | 6/2018 | Hasedzic | ................ B60Q 9/008 |

* cited by examiner

SYSTEMS FOR IMPROVING SIDE-MIRROR FUNCTIONALITY OF A VEHICLE

CROSS-REFERENCE TO RELATED APPLICATIONS

This application claims the benefit of U.S. Provisional Application Ser. No. 62/233,751, filed Sep. 28, 2015, and entitled "SYSTEMS FOR IMPROVED SIDE-MIRROR FUNCTIONALITY OF A VEHICLE", which is incorporated herein by reference in its entirety.

FIELD

This disclosure relates generally to side-mirrors, and more particularly, to systems for improving side-mirror functionality of a vehicle.

BACKGROUND

Vehicles for transportation often contain side mirrors for enhancing a field of view of an operator. These side mirrors supplement the field of view by allowing the operator to access an additional field of view that encompasses a side environment of a vehicle, a rear environment of a vehicle, or combinations thereof. The additional field of view helps the operator negotiate obstacles to a motion of the vehicle (e.g., pedestrians, other vehicles, curbs, etc.,) as well as guides for such motion (e.g., parking dividers, lane partitions, etc.).

SUMMARY

In one aspect, the disclosure is directed to a side mirror with an adjustable profile. The mirror is coupled to a side of a vehicle. An actuator is coupled to the mirror and configured to move the mirror between a retracted position and an extended position. A sensor is coupled to the vehicle, and oriented to capture a facial feature of a driver. A control unit is in communication with the actuator and the sensor. The mirror is configured to be in the retracted position when the facial feature is not oriented towards the mirror. The actuator is configured to move the mirror into the extended position when the sensor, during operation of the vehicle, captures the facial feature oriented towards the mirror.

In another aspect, the systems involve an integrated side mirror. The integrated side mirror includes a first aperture on an exterior surface of a portion of a vehicle. The integrated side mirror also includes a second aperture on an interior surface of the portion of the vehicle. The interior surface is exposed to a cabin of the vehicle. The integrated side mirror includes a first transmissive optic disposed in the first aperture and a second transmissive optic disposed in the second aperture. The second transmissive optic is visible to a driver. At least one optical element is disposed along an optical path between the first transmissive optic and the second transmissive optic. The optical element(s), in combination with the first transmissive optic, has a field of view encompassing a side environment of the vehicle, a rear environment of the vehicle, or combinations thereof.

In an additional aspect, the systems involve a display system for integrating side-mirror functionality into a display image. The display system includes a sensor (e.g., a camera) having a field of view and capability for imaging at least visible light. The field of view encompasses a side environment of a vehicle, a rear environment of the vehicle, or combinations thereof. The display system also includes an image-processing unit in communication with the sensor. The image processing unit processes images from the sensor to compile the display image. A display unit is in communication with the image-processing unit and forms the display image at a location visible to a driver.

Other systems for improving side-mirror functionality are presented.

BRIEF DESCRIPTION OF THE DRAWINGS

Although the following figures and description illustrate specific embodiments and examples, the skilled artisan will appreciate that various changes and modifications may be made without departing from the spirit and scope of the disclosure.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1:
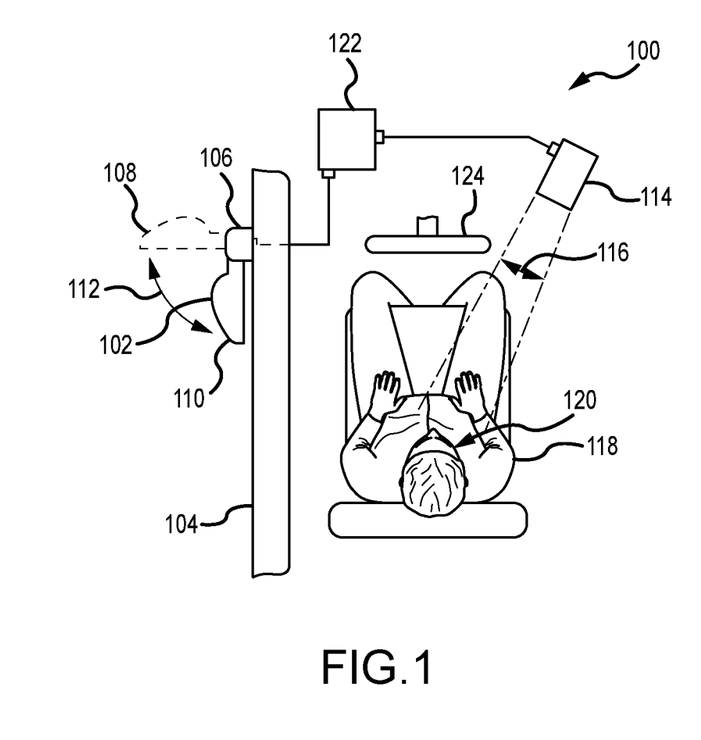
FIG. 1 is a schematic view of a side mirror with an adjustable profile, according to an illustrative embodiment.

Referring to FIG. 1, a schematic view is presented of a side mirror 100 with an adjustable profile, according to an illustrative embodiment. The side mirror 100 includes a mirror 102 coupled to a side 104 of a vehicle. An actuator 106 is coupled to the mirror 102 and is configured to move the mirror 102 between a retracted position 110 and an extended position 108. The actuator 106 may be a mechanical actuator, an electric actuator, a pneumatic actuator, a hydraulic actuator, or a magnetic actuator. Other types of actuators are possible. The retracted position 110 may correspond to a position with minimum aerodynamic drag of the mirror 102, and the extended position 108 may correspond to a position with maximum aerodynamic drag of the mirror 102. It will be appreciated that the mirror 102 may be moved into any position along an arc of motion 112 between the retracted position 110 and the extended position 108.

In FIG. 1, the retracted position 110 and the extended position 108 are depicted as being, respectively, parallel and perpendicular to the side 104. However, this depiction is not intended as being limiting. The retracted position 110 and the extended position 108 may be any position along an arc extending out from the side 104. Moreover, movement of the mirror 102 is not restricted to rotational motion and may involve a linkage or rail coupled to the actuator 106. In some embodiments, the actuator 106 moves the mirror 102 using linear motion. In other embodiments, the actuator 106 moves the mirror 102 using curvilinear motion. Other types of motion are possible.

The side mirror 100 also includes a sensor 114 coupled to the vehicle and oriented to capture a facial feature 118 of a driver 120. Such capturing may involve a field of view 116 directed at the facial feature 118. Non-limiting examples of the facial feature 118 include an eye, a nose, a mouth, a chin, and/or an ear. Other facial features are possible, including aspects of facial features such as relative positions, sizes, and shapes. Combinations of facial features and their aspects are also possible. In some embodiments, the side mirror 100 further includes a light source for illuminating the facial feature 118 of the driver 120. This can be beneficial for environmental conditions, such as night time, rain, fog, etc. with reduced illumination. The light source can provide visible light, infrared light, or a combination thereof. In some embodiments, the light source can be an LED lamp, an infrared lamp, an incandescent lamp, a fluorescent lamp, or other suitable lighting source. In embodiments using an infrared light source, the sensor 114 can also include the capability for infrared imaging.

The side mirror 100 also includes a control unit 122 in communication with the actuator 106 and the sensor 114. The control unit 122 signals the actuator 106 to move the mirror 102 into the extended position 108 when the sensor 114 captures the facial feature 118 oriented towards the mirror 102. The mirror 102 is in the retracted position 110 when the facial feature 118 is not oriented towards the mirror 102. In FIG. 1, the driver 120 is shown facing a steering wheel 124 and looking forward. As such, the facial feature 118 is not oriented towards the mirror 102 and the mirror 102 is therefore in the retracted position 110. In embodiments having the infrared light source, the infrared light source may be coupled to the sensor 114 or the control unit 122.

In some embodiments, the control unit 122 signals the actuator 106 to move the mirror 102 into the extended position 108 when the sensor 114 captures the facial feature 118 oriented towards to a rear-view mirror. In some embodiments, the control unit 122 signals the actuator 106 to move the mirror 102 into the extended position 108 when the sensor 114 captures the driver 120 making a gesture. In these embodiments, the gesture may include raising an arm, waving an arm, and making signs with fingers on a hand. Other gestures are possible.

In some embodiments, the control unit 122 signals the actuator 106 to move the mirror 102 into the extended position 108 during braking of the vehicle. In some embodiments, the control unit 122 signals the actuator 106 to move the mirror 102 into the extended position 108 when a turn-signal of the vehicle is activated. In some embodiments, the control unit 122 signals the actuator 106 to move the mirror 102 into the extended position 108 when the vehicle changes lanes. In these embodiments, the vehicle may be functioning in autonomous mode, i.e., an occupant is in the vehicle but not actively controlling or driving the vehicle. In autonomous mode, such signaling by the control unit 122 may be conducted in anticipation of a lane change, a turn, brake, or other change.

In some embodiments, the facial feature 118 includes an eye of the driver 120. In these embodiments, the control unit 122 signals the actuator 106 to move the mirror 102 towards the extended position 108 when a direction of gaze is oriented towards the mirror 102. In some embodiments, the facial feature 118 includes a nose of the driver 120. In such embodiments, the control unit 122 signals the actuator 106 to move the mirror 102 towards the extended position 108 when the nose is pointing towards the mirror 102.

In some embodiments, the side mirror 100 additionally includes a proximity sensor coupled to the vehicle and positioned thereon to detect objects proximate to the side of the vehicle and/or proximate to a side-rear of the vehicle. Such objects may include other vehicles, pedestrians, cyclists, signposts, parking meters, and fire hydrants. Other objects are possible. In such embodiments, the proximity sensor is in communication with the control unit 122. The control unit 122 further signals the actuator 106 to move the mirror 102 into the extended position 108 when the proximity sensor detects an obstruction. In further embodiments, the proximity sensor is selected from a group consisting of an ultrasonic sensor, a radar sensor, a lidar sensor, or other suitable sensor.

In operation, the mirror 102 defaults to the retracted position 110. The sensor 114, in combination with the control unit 122, monitors the facial feature 118 of the driver 120, which includes an orientation thereof. If the facial feature 118 becomes oriented towards the mirror 102, the control unit 122 signals the actuator 106 to move the mirror 102 into the extended position 108. The extended position 108 is maintained as long as the sensor 114 continues to image the facial feature 118 oriented towards the mirror 102. However, if the driver 120 looks away from the mirror 102, the control unit 122 can signal the actuator 106 to return the mirror 102 to the retracted position 110. Thus, the control unit 122 dynamically adjusts a profile of the mirror 102 in response to an orientation of the facial feature 118. Such adjustment may occur predictively when the driver 120 begins to orient the facial feature 118 towards the mirror 102. The control unit 122 may also adjust the profile of the mirror 102 in response to other conditions such as when the facial feature 118 is oriented towards the rear-view mirror, the turn signal of the vehicle is activated, etc.

In some embodiments, the control unit 122 reduces distance between the extended position 108 and the retracted position 110 in response to a speed of the vehicle. In these embodiments, the control unit 122 signals the actuator 106 to extend the mirror 102 only partially during high speeds. For example, and without limitation, the mirror may be moved 70° along an 90° arc extending outward from the retracted position 110. Other reduced extended positions are possible.

Figure 2:
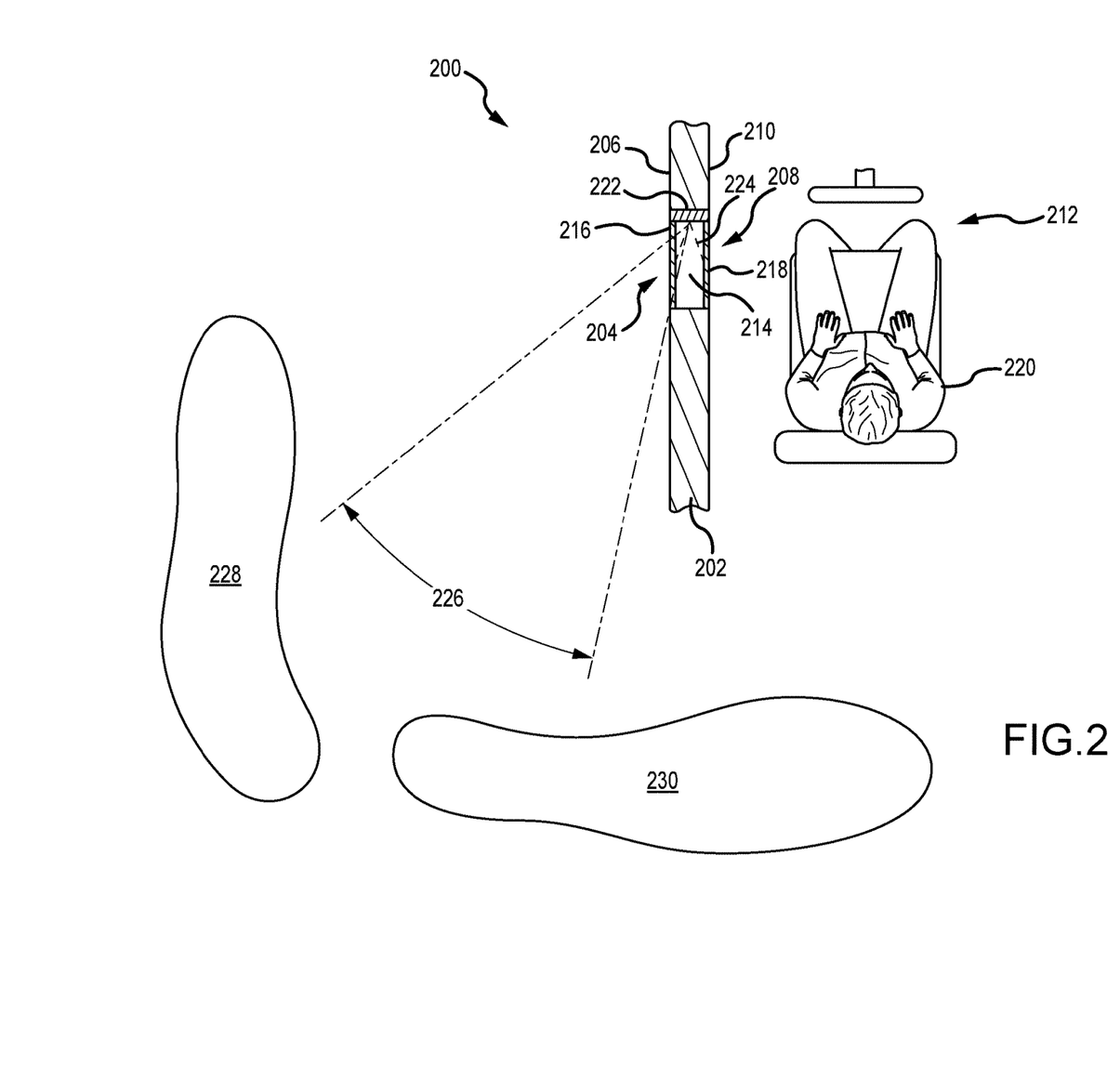
FIG. 2 is a schematic view, with a portion shown in cross-section, of an integrated side mirror, according to an illustrative embodiment.

Now referring to FIG. 2, a schematic view is presented, with a portion shown in cross-section, of an integrated side mirror 200, according to an illustrative embodiment. The integrated side mirror 200 is disposed within a portion 202 of a vehicle. In some embodiments, the portion 202 is selected from the group consisting of a side-door panel, an A-pillar, or a combination thereof. In FIG. 2, the portion 202 is depicted as the side-door panel. The integrated side mirror 200 includes a first aperture 204 on an exterior surface 206 of the portion 202. The integrated side mirror 200 also includes a second aperture 208 on an interior surface 210 of the portion 202. The interior surface 210 is exposed to a cabin 212 of the vehicle. In some embodiments, such as that depicted in FIG. 2, an optional cavity 214 extends from the first aperture 204 to the second aperture 208. The integrated side mirror 200 also includes a first transmissive optic 216 and a second transmissive optic 218. The first transmissive optic 216 and the second transmissive optic 218 are disposed, respectively, in the first aperture 204 and the second aperture 208. The second transmissive optic 218 is visible to a driver 220.

An optical element 222 is disposed along an optical path 224 between the first transmissive optic 216 and the second transmissive optic 218. Non-limiting examples of the optical element 222 include shutters, lenses, prisms, mirrors, filters, collimators, light pipes, beam splitters, and diffraction gratings. Other types of optical elements are possible and may involve assemblies thereof. In some embodiments, the optical element 222 includes a mirror. It will be appreciated that the first transmissive optic 216 and the second transmissive optic 218 may be utilized to optically manipulate light along with the optical element 222. For example, and without limitation, the first transmissive optic 216 and the second transmissive optic 218 may incorporate lens structures therein to interact with light via refraction. Other configurations, however, are possible, including configurations associated with shapes of the first transmissive optic 216 and the second transmissive optic 218.

In some embodiments, the first transmissive optic 216, the optical element 222, and the second transmissive optic 218 use direct optical coupling to define the optical path 224. Such direct optical coupling may involve optical grease, optical epoxy, fiber optics, light guides, or other waveguide structures. Other types of direct optical couplings are possible, including combinations. In these embodiments, the optional cavity 214 may not be present. Thus, it will be understood that the optional cavity 214 depicted by FIG. 2 is for purposes of illustration only and is not intended as limiting.

The optical element 222, in combination with the first transmissive optic 216, has a field of view 226 encompassing a side environment 228 of the vehicle, a rear environment 230 of the vehicle, and combinations thereof. Such combinations may involve portions of the side environment 228 and the rear environment 230. In FIG. 2, the field of view 226 is depicted as encompassing a portion of the side environment 228 and a portion of the rear environment 230. However, this depiction is not intended as limiting. In some embodiments, the optical element 222 scales images of the field of view 226. Such scaling may enable the driver 220 to perceive objects at positions that accurately represent their distances from the vehicle when viewing the integrated side mirror 200.

In FIG. 2, the optical element 222 is depicted as being a single assembly. However, the optical element 222 could involve multiple assemblies, each having a distinct optical path between the first transmissive optic 216 and the second transmissive optic 218. For example, and without limitation, the optical element 222 could include a first optical assembly dedicated to a long-range field of view and a second optical assembly dedicated to a short-range field of view. The former assembly could be associated with high-speed operation of the vehicle (e.g., driving on a highway) while the latter assembly could be associated with slow-speed operation of the vehicle (e.g., during parking). Other types of assemblies are possible.

In some embodiments, the first transmissive optic 216 provides a continuous surface with the external surface. The continuous surface may be smooth, have no protrusions relative to the external surface, and be planar, such as that shown in FIG. 2. Alternatively, the continuous surface may exhibit a smooth, but contoured profile (e.g., concave, convex, etc.). Other topologies are possible. For example, and without limitation, the continuous surface may be shaped to allow protrusion of the optical element 222 out of the first aperture 204. In another non-limiting example, the continuous surface may be shaped to form a lens structure (e.g., a fish-eye lens) that faces a portion of the side environment 228 and a portion of the rear environment 230. In general, the continuous surface exhibits a topology to complement optical manipulations of optical element 222 and enable its desired field of view 226.

In some embodiments, the integrated side mirror 200 further includes an actuator coupled to the optical element 222. The actuator is operable to displace the optical element 222 to adjust the field of view 226, an image viewed through the second transmissive optic 218, or a combination thereof. The actuator may be a mechanical actuator, an electric actuator, a pneumatic actuator, a hydraulic actuator, or a magnetic actuator. Other types of actuators are possible.

In further embodiments, the integrated side mirror 200 includes a sensor having a sensor field of view and coupled to the vehicle. The sensor is oriented such that the sensor field of view captures facial feature of the driver 220 (e.g., an eye). In such embodiments, the integrated side mirror 200 also includes a control unit in communication with the actuator and the sensor. The control unit signals the actuator to move the optical element in response to a position, an orientation, or combinations thereof, of the facial feature. This signaling may enable the optical element to maintain a portion of the optical path 224 oriented towards a head of the driver 220 (i.e., towards the facial feature). In these instances, the integrated side mirror 200 can compensate for motion of the driver 220 as such motion that occurs within the cabin 212 of the vehicle. The control unit may also allow the integrated side mirror 200 to accommodate different drivers, but without using predetermined information (e.g., driver presets).

In operation, the field of view 226 defines portions of the side environment 228, the rear environment 230, or both, that are optically accessible to a combination of the first transmissive optic 216 and the optical element 222. Light from these portions is received through the first aperture 204 via the first transmissive optic 216. Such received light travels along the optical path 224 until encountering the optical element 222. The optical element 222 alters a direction of the received light towards the second aperture 208. After alteration, the received light continues along the optical path 224 and exits through the second transmissive optic 218. The driver 220, when looking at the second transmissive optic 218, sees an image of the field of view 226. It will be appreciated that the optical element 222 may also manipulate the received light to enhance the image of the field of view 226 (e.g., scaling the image, rectifying the image, etc.)

In embodiments having the actuator, the driver 220 may displace the optical element 222 to adjust the field of view 226, adjust the image viewed through the second transmissive optic 218, or both. For example, and without limitation, the driver 220 could adjust the field of view 226 to change portions of the side environment 228, the rear environment 230, or both, that are included in the image. In another non-limiting example, the driver could adjust the image to better orient the image towards the driver 220. In general, the actuator enables the optical element 222 to alter its optical manipulations of the received light, which includes altering the optical path 224.

In embodiments having the sensor and the control unit, the sensor images the facial features of the driver 220, thereby allowing the control unit to determine the position, the orientation, or both, of the facial feature. In response, the control unit signals the actuator to move the optical element 222 such that the optical path 224 terminates with the portion oriented towards the facial feature. Such orientation is maintained dynamically as the sensor continues to image the facial features. Moreover, when a new driver operates the vehicle, the control system is able to automatically adjust the image to accommodate the new driver.

Figure 3:
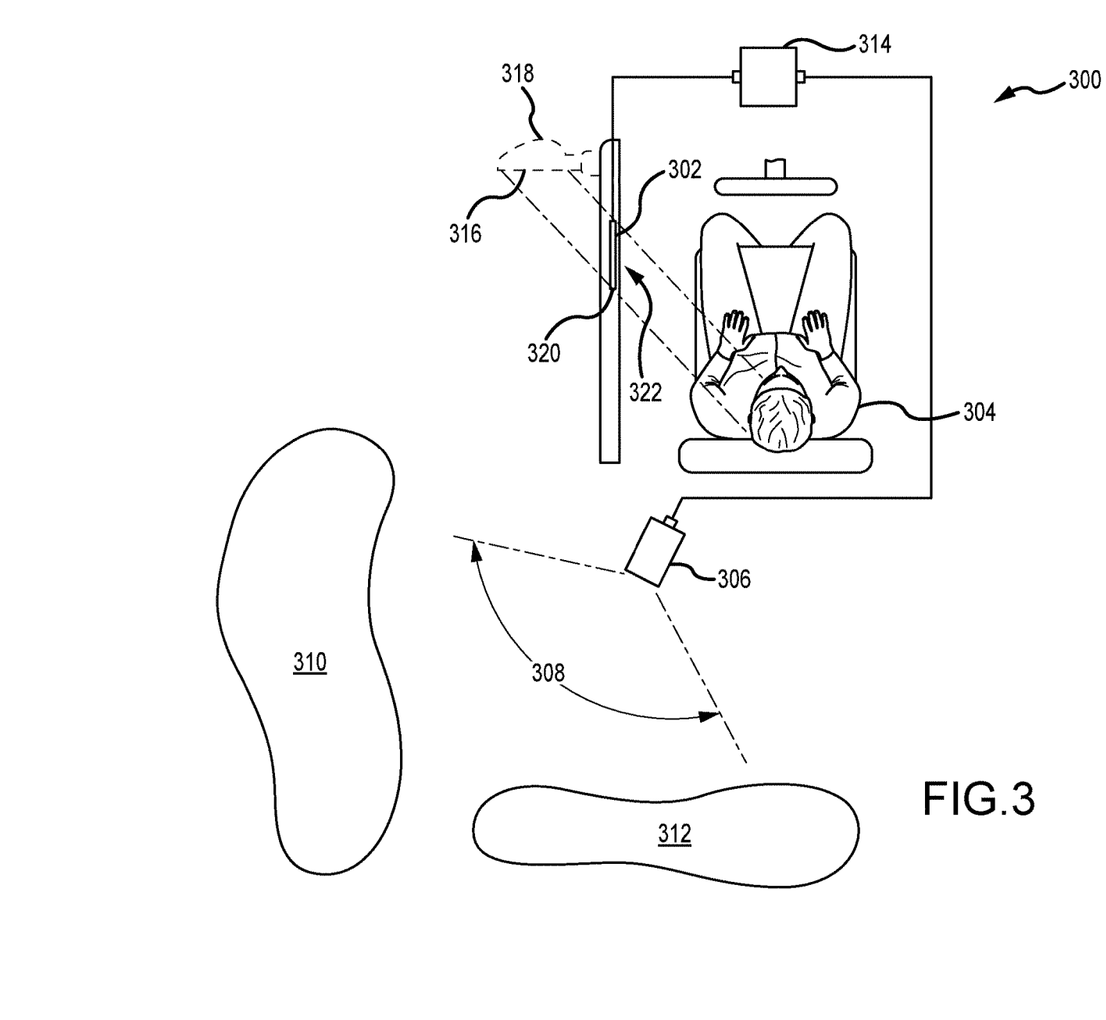
FIG. 3 is a schematic view of a display system for integrating side-mirror functionality into a display image, according to an illustrative embodiment.

Now referring to FIG. 3, a schematic view is presented of a display system 300 for integrating side-mirror functionality into a display image 302, according to an illustrative embodiment. In FIG. 3, the display system 300 is shown in the context of a vehicle, and more specifically, relative to a driver 304 seated in a cabin of the vehicle. The display system 300 includes a sensor 306 capable of imaging at least visible light. In some embodiments, the capability for imaging further includes infrared light, ultraviolet light, lidar, radar, ultrasound other imaging or depth sensor, or combinations thereof. In such embodiments, the capability for imaging may improve visibility of the sensor 306 in adverse conditions such as fog, rain, snow, low light, etc. Other benefits are possible. The sensor 306 captures images of a field of view 308 that can encompasses a side environment 310 of the vehicle, a rear environment 312 of the vehicle, or combinations thereof. Such combinations may involve portions of the side environment 310 and the rear environment 312. In some embodiments, the sensor 306 can be a camera. In specific embodiments, the camera is a wide-field camera. In such embodiments, the wide-field camera broadens the field of view 308 relative to that achieved by a conventional camera optic. Non-limiting examples of the wide-field camera include a camera having a wide-field optic (e.g., a fish-eye lens, a retrofocus lens, a short-focus lens, etc.) or an array of micro-cameras fiber-coupled to a monocentric lens. Other wide-field cameras are possible.

The display system 300 also includes an image-processing unit 314 in communication with the sensor 304. The image-processing unit 314 is operable to process images from the sensor 304 to compile the display image 302. Such compilation may produce data representing the display image 302. The image-processing unit 314 may compile the display image 302 and correct distortion errors and perspective errors in images of the field of view 308; to scale images of the field of view 308 for magnification adjustment; to control exposure of images of the field of view 308 for optimal viewing; to enhance contrast of images of the field of view 308 for improved object recognition; to reduce glaresin images of the field of view 308 resulting from "hotspots" (e.g., from headlights, lamps, the sun, etc.); and to augment images of the field of view 308 with information overlays (e.g., hazard identification, distances, etc.). Other functions are possible. In embodiments where the capability for imaging includes infrared light, ultraviolet light, or combinations thereof, the image processing unit 314 compiles the display image 302 to include a multi-spectral image overlay. The multi-spectral image overlay may enable the driver 304 to better identify features or objects under adverse conditions.

The display image 302 may involve virtual plane 316 such that, when the display image 302 is formed, information in the virtual plane 316 is perceived by the driver 304 as being displaced relative to the display image 302. Such displacements may include displacements into (or "beyond") the display image 302 or displacements out of the display image 302. Combinations of displacements are possible using multiple virtual planes, which may produce a holographic image. In FIG. 3, the virtual plane 316 is depicted where a side mirror 318 would traditionally be positioned. However, this depiction is not intended as limiting. The virtual plane 316 could be displaced at any depth or orientation relative to the display image 302, including positions perceived to be in front of the display image 302. In some embodiments, the display image 302 utilizes the virtual plane 316 to render holographic images.

The display system 300 also includes a display unit 320 in communication with the image-processing unit 314. The display unit 320 forms the display image 302 at a location 322 visible to the driver 304, which may include receiving signals that represent data compiled by the image-processing unit 314. The location 322 may be distinct from the display unit 320 and the display image 302 may be split across multiple locations. For example, and without limitation, the display unit 320 may be a heads-up display unit that projects the display image 302 onto a driver's side window of the vehicle. In a further non-limiting example, the heads-up display projects the display image 302 onto the driver's side window and/or a front window of the vehicle. Other types of display units 320 and locations 322 are possible.

The display unit 320 may be transparent, opaque, or switchable between transparent and opaque. The display unit 320 may also be capable of forming real images, virtual images, or any combination thereof. In some embodiments, the location 322 is selected from the group consisting of a dash of the vehicle, an A-pillar of the vehicle, the front window of the vehicle, the driver's side window of the vehicle, a passenger's side window of the vehicle, or any combination thereof.

In some embodiments, such as that shown in FIG. 3, the location 322 is the driver's side window of the vehicle and the display image 302, when viewed by the driver 304, is perceived to correspond to a position associated with the side mirror 318. In these embodiments, the display unit 320 forms the display image 302 to include the virtual plane 316. A resolution of the display unit 320 may be high enough such that the display image 302 contains detail rivaling (or exceeding) that of a conventional side mirror. The resolution of the display unit 302 may be less than 1 minute of arc per pixel. Moreover, the display 302 may be capable of rendering a color gamut that accurately portrays colors in the side environment 310 and the rear environment 312. In further embodiments, the display image 302 further includes a static image representing the side mirror 318. Such representation may include physical extent of the side mirror 318.

In some embodiments, the display unit 320 includes an optical layer coupled to a window of the vehicle. In these embodiments, the optical layer may be embedded within the window or positioned on a surface of the window (i.e., interior or exterior). The optical layer may be conformal or planar. In some embodiments, the display unit 320 is selected from group consisting of a waveguide, an OLED display, an LCD display, and a projection-based beam combiner. In these embodiments, the OLED display and the LCD display may be transparent. The projection-based beam combiner may be a heads-up display.

In some embodiments, the display unit 320 includes an output grating disposed within a side window of the vehicle to direct light signals towards the driver 304. The side window may be associated with a driver's side or a passenger's side. In such embodiments, the display unit 320 also includes a waveguide coupled to the output grating. The waveguide may be disposed within a side door panel, disposed within an A-pillar, disposed within the side window, or combinations thereof. These combinations may involve portions of the waveguide. The waveguide may be disposed within the side window as a waveguide optical layer. During operation, the waveguide utilizes internal reflection to guide light signals to the output grating. The display unit 320 also includes an image source disposed within the side door panel. An optical element is disposed along an optical path extending from the image source to the waveguide. The image source generates light signals that traverse the optical path to reach the waveguide. While traversing the optical path, the light signals interact with the optical element to focus, expand, or redirect the light signals—including any combination thereof.

In further embodiments, the display unit 320 includes a static holographic image that represents a physical enclosure of the side mirror 318. The static holographic image may be integrated into the waveguide optical layer or be a separate optical layer coupled to the side window.

In further embodiments, the display unit 320 includes a switchable attenuator behind the output grating. The switchable attenuator, when active, selectively occludes light transmission from behind the output grating, thereby increasing a contrast of the display unit 320. Such increased contrast may improve viewability of the display image 302. Non-limiting examples of the switchable attenuator include a liquid crystal filter, an electrochromic filter, and a photochromic filter. Other types or attenuators are possible.

In some embodiments, the display system 300 includes a head tracking unit. The head tracking unit activates the display unit 320 when the driver 304 orients the facial feature towards the position associated with the side mirror 318. When inactive, the display unit 320 is transparent, allowing improved peripheral vision of the driver 304 relative to an activated display unit 320. In some embodiments, the sensor 306 captures three-dimensional images of the field of view 308. In these embodiments, the display unit 320 includes a three dimensional display or other way of representing the three dimensional data.

In operation, the display system 300 uses the sensor 306 to capture images of the field of view 308. These images contain features and objects from the side environment 310 and the rear environment 312, or a combination thereof. The sensor 306 then generates signals representing images of the field of view 308. The image-processing unit 314 receives such signals, and in response, compiles data that represents the display image 302. The display image 302 incorporates the field of view 308 therein and may include the virtual plane 316. Other features may be incorporated into the display image 302 such as multi-spectral image overlays and information overlays (e.g., hazard identification, distances, etc.) The image-processing unit 314 sends the data to the display unit 320, which forms the display image 302 at the location 322. In FIG. 3, the location 322 is the driver's side window of the vehicle.

The driver 304, when viewing the display image 302 at the location 322, sees the field of view 308 recreated as the real image, the virtual image 316, or a combination thereof. The display image 302 in FIG. 3 is illustrated as having the virtual image 316 displaced outward to the position associated the side-view mirror 318. Thus, the display system 300 enables the driver 304 to perceive the field of view 308, but at a depth that is natural relative to a front driving view. It will be appreciated that the display system 300 of FIG. 3 provides side-mirror functionality without negatively impacting aerodynamic drag or increasing a risk of collision (i.e., with other cars, cyclists, individuals, etc.). Moreover, the display system 300 can achieve a field of view greater than a conventional side mirror, improving visual access of the driver 304 to the side environment 310 and the rear environment 312. Other advantages of the display system 300 are possible.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An integrated side mirror, comprising:
   a first aperture on an exterior surface of a portion of a vehicle, the exterior surface exposed to an exterior environment around the vehicle;
   a second aperture on an interior surface of the portion of the vehicle, the interior surface exposed to a cabin of the vehicle;
   a first transmissive optic disposed in the first aperture;
   a second transmissive optic disposed in the second aperture and directly visible to a driver; and
   an optical element disposed along an optical path between the first transmissive optic and the second transmissive optic;
   wherein the optical element, in combination with the first transmissive optic and the second transmissive optic, has a field of view encompassing a side environment of the vehicle, a rear environment of the vehicle, or combinations thereof, and
   wherein the first transmissive optic, the optical element, and the second transmissive optic are directly coupled to define the optical path.

2. The integrated side mirror of claim 1, wherein the optical element comprises a mirror.

3. The integrated side mirror of claim 1, wherein the portion of the vehicle is selected from a group consisting of a side-door panel, an A-pillar, or a combination thereof.

4. The integrated side mirror of claim 1, wherein the first transmissive optic is configured to provide a continuous surface with the exterior surface.

5. The integrated side mirror of claim 1, further comprising an actuator coupled to the optical element, the actuator configured to displace the optical element to adjust the field of view, an image viewed through the second transmissive optic, or a combination thereof.

6. The integrated side mirror of claim 5, further comprising:
   a sensor having a field of view and coupled to the vehicle, the sensor oriented such that the field of view is configured to capture a facial feature of the driver; and
   a control unit in communication with the actuator and the sensor, the control unit configured to signal the actuator to move the optical element in response to a position, an orientation, or combinations thereof, of the facial feature.

7. An integrated side mirror, comprising:
   a first aperture on an exterior surface of a side door of a vehicle;
   a first transmissive optic disposed in the first aperture and exposed to an exterior environment of the vehicle;
   a second aperture on an interior surface of the side door of the vehicle;
   a second transmissive optic disposed in the second aperture and directly visible to a driver; and
   an optical element directly coupled to the first transmissive optic and the second transmissive optic,
   wherein the optical element defines an optical path between the first transmissive optic and the second transmissive optic, and
   wherein the optical element, in combination with the first transmissive optic and the second transmissive optic, has a field of view encompassing a side environment of the vehicle, a rear environment of the vehicle, or combinations thereof.

8. The integrated side mirror of claim 7, wherein the first transmissive optic is configured to provide a continuous surface with the exterior surface of the side door.

9. The integrated side mirror of claim 8, wherein the first transmissive optic is shaped to allow protrusion of the optical element out of the first aperture.

10. The integrated side mirror of claim 7, further comprising:
an actuator coupled to the optical element, the actuator configured to displace the optical element to adjust the field of view, an image viewed through the second transmissive optic, or a combination thereof.

11. The integrated side mirror of claim 10, wherein the optical element manipulates received light to scale the field of view, rectify the image viewed through the second transmissive optic, or a combination thereof.

12. The integrated side mirror of claim 11, further comprising:
a sensor coupled to the vehicle and oriented such that a field of view of the sensor is configured to capture a facial feature of the driver.

13. The integrated side mirror of claim 12, further comprising:
a control unit in communication with the actuator and the sensor, the control unit configured to signal the actuator to move the optical element in response to a position, an orientation, or combinations thereof, of the facial feature.

14. The integrated side mirror of claim 11, wherein the optical element comprises a mirror.

15. An integrated side mirror, comprising:
a first aperture on an exterior surface of a portion of a vehicle, the exterior surface exposed to an exterior environment around the vehicle;
a first transmissive optic disposed in the first aperture;
a second aperture on an interior surface of the portion of the vehicle, the interior surface exposed to a cabin of the vehicle;
a second transmissive optic disposed in the second aperture and directly visible to a driver; and
a mirror directly coupled to the first transmissive optic and the second transmissive optic,
wherein the first transmissive optic, the mirror, and the second transmissive optic define an optical path, and
wherein the mirror, in combination with the first transmissive optic and the second transmissive optic, has a field of view encompassing a side environment of the vehicle, a rear environment of the vehicle, or combinations thereof.

16. The integrated side mirror of claim 15, wherein the portion of the vehicle is selected from a group consisting of a side-door panel, an A-pillar, or a combination thereof.

17. The integrated side mirror of claim 15, wherein the first transmissive optic is shaped to allow protrusion of the mirror out of the first aperture.

18. The integrated side mirror of claim 15, further comprising:
an actuator coupled to the mirror, the actuator configured to displace the mirror to adjust the field of view, an image viewed through the second transmissive optic, or a combination thereof.

19. The integrated side mirror of claim 18, wherein the mirror manipulates received light to scale the field of view or rectify the image viewed through the second transmissive optic, or a combination thereof.

20. The integrated side mirror of claim 18, further comprising:
a sensor coupled to the vehicle and oriented such that a field of view of the sensor is configured to capture a facial feature of the driver; and
a control unit in communication with the actuator and the sensor, the control unit configured to signal the actuator to move the mirror in response to a position, an orientation, or combinations thereof, of the facial feature.

* * * * *

UNITED STATES PATENT AND TRADEMARK OFFICE
CERTIFICATE OF CORRECTION

PATENT NO. : 10,486,600 B1  
APPLICATION NO. : 15/271729  
DATED : November 26, 2019  
INVENTOR(S) : David G. Havskjold et al.

Page 1 of 1

It is certified that error appears in the above-identified patent and that said Letters Patent is hereby corrected as shown below:

In the Claims

At Column 11, Claim number 14, Line number 29:
"side mirror of claim 11" should be --side mirror of claim 7--.

Signed and Sealed this
Fourteenth Day of January, 2020

Andrei Iancu
*Director of the United States Patent and Trademark Office*